United States Patent Office 3,497,533
Patented Feb. 24, 1970

3,497,533
METHOD OF PREPARING 1-DEHYDRO-9β,10α-STEROIDS
Pieter Westerhof, Van Houtenlaan, Weesp, Netherlands, and Johan Adriaan Eenkhoorn, Scarborough, Toronto, Canada, assignors, by mesne assignments, to U.S. Philips Corporation, New York, N.Y., a corporation of Delaware
No Drawing. Filed July 16, 1965, Ser. No. 472,685
Claims priority, application Switzerland, Oct. 28, 1964, 13,979/64
Int. Cl. C07c 169/66, 167/14
U.S. Cl. 260—397.3
8 Claims

ABSTRACT OF THE DISCLOSURE

The introduction of a 1-dehydro bond into a 3-keto-4,6-bisdehydro 9β,10α steroid of the androstane and pregnane series by forming a complex with 2,3-dichloro-5,6-dicyano-benzoquinone in an anhydrous acid medium and then neutralizing the medium to decompose the complex.

---

It is known (Belgian patent specification 654,437) that in 9β,10α-steroids a 1-dehydro bond can be introduced into 3-keto-4-dehydro steroids by means of 2,3-dichloro-5,6-dicyanobenzoquinone (DDQ) according to a method used by Burn in normal steroids (Proc. Chem. Soc. 1960, page 14). This method, which is performed in a neutral solvent, for example, dioxane or tetrahydrofurane, gives a comparatively low yield of the desired 1-dehydro compound. Another drawback is that the reaction time is comparatively long and the reaction has to be carried out at elevated temperature.

Applicants have found, that the reaction can be performed with a considerably higher yield when it is carried out with DDQ in an anhydrous acid medium.

Other advantages of the new method are for example a low reaction temperature and a short duration, as a result of which it is still possible to use the method in otherwise acid-sensitive steroids, notably 17α-alkyl-17β-hydroxy-9β,10α-steroids.

The invention consists of a method of preparing 1-dehydro-9β,10α-steroids, characterized in that a 9β,10α-steroid which contains a 3-keto oxygen atom, a double bond in 4-position and one or two hydrogen atoms at carbon atom 2 of the steroid skeleton is caused to react with DDQ in an anhydrous or substantially anhydrous, acid medium, followed by decomposition of the intermediately formed complex.

The method according to the invention is particularly suitable for use in 9β,10α-steroids which contain at carbon atom 17 an acetyl group in β-position and a hydrogen atom or a free, etherified or esterified hydroxy group in α-position, or in β-position a free or etherified esterified hydroxy group and in α-position a hydrogen atom or a saturated or unsaturated alkyl group with 1–6 carbon atoms, for example, a methyl group, ethyl group, propyl group, alkyl group or methallyl group.

Substituents may also be present in other positions of the steroid skeleton as long as they do not interfere with the free hydrogen atoms of carbon atom 2. In particular, a double band at carbon atom 6 may be present, while in addition to a fluorine atom, chlorine atom or bromine atom may be bound to carbon atom 6.

The reaction with DDQ may have a comparatively short duration, i.e. from 30 minutes to 3 hours, and be performed mainly at comparatively low temperature, i.e. between −10° C. and +40° C., in particular between 0° C. and 25° C. Very good results were obtained with a duration of the reaction of approximately 90 minutes at a temperature of from 15° C. to 25° C.

The reaction must be carried out in a substantially anhydrous medium, which means that a water concentration above 0.5% must be avoided.

During the reaction a complex of the steroid and DDQ is formed. By decomposition of the complex the 1-dehydro bond is formed. Of course for obtaining a maximum yield of 1-dehydro compound the 9β,10α-steroid must be completely converted into the complex with DDQ. The complex is soluble in alkali. By extraction with alkali it can consequently be easily established whether optimum complex formation has taken place. In fact, in such a case the residue of the reaction medium extracted with alkali contains no steroid any more. The formation of the complex with DDQ can also be easily followed with the thin-layer-method. The "DDQ-9β,10α-steroid" complex can easily be decomposed by neutralising the reaction medium; in fact, in neutral circumstances, the complex decomposes into the desired 1-dehydro compound and 2,3-dichloro-5,6-dicyanobenzohydroquinone (DDHQ). Consequently the method according to the invention may also be formulated thus that the reaction complex of DDQ and 3-keto-4-dehydro-9β,10α-steroid, as formed in anhydrous acid medium, is neutralized and then decomposed. The neutralized medium may be stored for some time and be left to stand to complete the reaction, but the reaction may also be accelerated by heating the reaction medium for a short period of time. This latter is to be preferred.

The DDQ-9β,10α-steroid complex is preferably formed in a medium which contains as acid a hydrohalide, in particular hydrogen chloride. The reaction may also be performed with the use of paratoluene sulphonic acid as a catalyst. The concentration hereof may vary within very wide limits somewhat in accordance with the nature of the substituents at the steroid molecule. For example, when a 6-dihydro double bond and possibly a fluorine atom, chlorine atom or bromine atom is present in 6-position, the concentration of hydrogen chloride preferably lies between 0.1% w./v. and the concentration of saturation of the hydrogen chloride. Very good results were obtained in a concentration of 1–65 mg. of hydrogen chloride per ml. of reaction liquid.

When the starting compound does contain the 3-keto-4-dehydro system but does not contain a 6-dehydro bond but, if required, a fluorine atom, chlorine atom or bromine atom at carbon atom 6, it is to be preferred that the concentration of hydrogen chloride lies between 0.1 and 5 mg. of the acid per ml. of reaction liquid and preferably between 0.1 and 1 mg. of acid per ml. of reaction liquid.

Of course the complex must be formed in the presence of a solvent. For this purpose are to be considered polar neutral solvents, for example, dioxane or tetrahydrofurane.

The neutralization of the medium in which the complex is formed may be effected with a normal base or an alkaline reacting compound, for example, calcium carbonate, sodium bicarbonate or organic amines, for example pyridine or collidine.

The complex of DDQ and 9β,10α-steroid decomposes in neutral medium. At room temperature this takes some time. It consequently is recommendable to accelerate the decomposition reaction by heating. This may be effected, for example, at the boiling temperature of the medium. In general the decomposition reaction is completed within 30 minutes at a temperature of from 60–80°. Then the 1-dehydro-9β,10α-steroid formed can be isolated from the reaction mixture in the normal manner, for example, after first removing the reduced DDQ which is poorly soluble. The purification of the 1-dehhydro-9β,10α-steroid formed can easily be performed, yields being obtained which are approximately 50% higher than when the reaction was carried out according to any of the conventional known methods.

It is noted in this connection that it was known in the normal steroid series (namely steroids with a 8β, 9α, 10β, 13β, 14α configuration) to introduce a double bond between the carbon atoms 1,2 by reaction by a 3-keto-4-dehydro steroid with DDQ and a catalyst, for example, paranitrophenol (Belgian patent specification 576,345) or para-toluenesulphonic acid (Canadian J. Chem. 38, 1495 (1960)). The reaction as such of these compounds with DDQ in a medium containing hydrogen chloride was also known but it resulted in this normal steroid series in the introduction of a 6-dehydro double bond (Chem. and Ind. 1962, page 211).

In order that the invention may readily be carried into effect, it will now be described in greater detail, with reference to the ensuing specific examples.

Example I

A solution of 3.5 g. of 2,3-dichloro-5,6-dicyano-benzoquinone in 60 ml. of dioxane which contained 1‰ of hydrogen chloride was added to a solution of 4.5 g. of 4 - methyl-17β-hydroxy-9β,10α-androsta-4,6-diene-3-one. This latter compound was obtained by reacting 9β,10α-androst-4-ene-3-one-17β-ol with a solution of potassium in absolute tertiary butanol and adding to the resulting solution a solution of methyl iodide in absolute tertiary butanol and then introducing in the resulting 4-methyl-17β-hydroxy-9β,10α-androst-4-ene-3-one a double bond between the carbon atoms 6 and 7 with 2,3-dichloro-5,6-dicyano-benzoquinone in the presence of approximately 6% by volume of hydrochloric acid gas in 60 ml. of dioxane in which 60 mg. of hydrogen chloride had been dissolved. The reaction mixture was stirred at room temperature for 90 minutes. The reaction mixture was then neutralized with 1.1 g. of sodium bicarbonate after which the reaction liquid was refluxed for 30 minutes. The cooled reaction mixture was filtered through a column of 7 mg. of aluminum oxide, the substance was eluted with a benzol-ether mixture (1:1), and the eluate was evaporated to dryness in vacuo. The crude crystals were recrystallised from a mixture of acetone and isopropylether. The resulting 4-methyl - 17β-hydroxy-9β,10α-androsta-1,4,6-triene-3-one had a melting point of 180–181° C. Yield: 74%.

Example II

17α - methyl - 17β-hydroxy-9β,10α-androst-4-ene-3-one was heated at 120° for a few hours with equal quantities of thiophenol and paraformaldehyde in triethanolamine. 17α - methyl-17β-hydroxy-4-phenyl-thiomethyl-9β,10α-androst-4-ene-3-one was formed. A solution of the said compound in acetone was added to a mixture of deactivated Raney nickel and acetone. The mixture was heated under reflux for a few hours. After filtering off the catalyst the solvent was evaporated in vacuo and the residue chromatographed over aluminum oxide. From the benzene-petroleum ether fraction (6:1) and from the benzene fraction 4,17α - dimethyl - 17β-hydroxy-9β,10α-androst-4-ene-3-one was isolated. A double bond was introduced in the compound between the carbon atoms 6 and 7 by means of 2,3-dichloro-5,6-dicyano-benzo-quinone in the presence of 6.5% by volume of HCl gas.

2.5 g. of 4,17α-dimethyl-17β-hydroxy-9β,10α-androsta-4,6-diene-3-one, 1.8 g. of 2,3-dichloro-5,6-dicyanobenzoquinone and 70 ml. of dioxane which contained 1‰ of hydrogen chloride gas were stirred at room temperature for 90 minutes. 600 mg. of sodium bicarbonate were added to the reaction mixture and the mixture was then refluxed for 15 minutes. After cooling the reaction mixture was filtered over 40 g. of aluminum oxide (activity II) and then eluted with diethylether. The eluate was concentrated in vacuo and the residue recrystallised two times from a mixture of acetone and isopropylether (1:1). 4,17α-dimethyl - 17β - hydroxy-9β,10α-androsta-1,4,6-triene-3-one was obtained. Yield 58%. Melting point 162–163°. $[\alpha]_D^{25} = -441°$ (c.=0.1 in dioxane). U.V.: $\lambda_{max}$, 224 mμ, ε=14,800, $\lambda_{max}$ 309 mμ, ε=10,600, $\lambda_{max}$ 252 mμ, ε=7,800.

Example III

A solution of 17α-methyl-17β-hydroxy-9β,10α-androst-4-ene-3-one in tertiary butanol was added to a solution of potassium in tertiary butanol. The mixture was heated to the boiling point after which ethyl iodide dissolved in tertiary butanol was added dropwise while refluxing and passing nitrogen. 4-ethyl-17α-methyl-17β-hydroxy-9β,10α-androst-4-ene-3-one was isolated from the reaction mixture. A double bond was introduced in this compound between the carbon atoms 6 and 7 by means of 2,3-dichloro-5,6-dicyano-benzoquinone in dioxane which contained 6.5% of hydrogen chloride.

A mixture of 2.0 g. of 4-ethyl-17α-methyl-17β-hydroxy-9β,10α-androsta-4,6-diene-3-one, 1.65 g. of 2,3-dichloro-5,6-dicyanobenzoquinone and 110 ml. of dioxane which contained 1‰ of hydrogen chloride gas was stirred at room temperature for 90 minutes. 0.5 g. of calcium carbonate was added to the reaction mixture, after which the whole was refluxed for 15 minutes. The cooled reaction mixture was filtered over 40 g. of aluminum oxide (activity II). From this the compound was entirely eluted with diethylether, after which it was recrystallized from a mixture of aceton and hexane. Yield 1.2 g. (60%) of 4-ethyl-17α - methyl-17β-hydroxy-9β,10α-androsta-1,4,6-triene-3-one. Melting point 196–197° C. U.V. spectrum: $\lambda_{max}$ 225, ε=15,000; $\lambda_{max}$ 308, ε=10,800; $\lambda_{max}$ 252, ε=8,100. $\alpha_D^{25} = -406°$ (c.=0.1 in dioxane).

Example IV

To a stirred solution of 5.0 g. of 9β,10α-pregna-4,6-diene-3,20-dione and 4.55 g. (125%) of DDQ in 146 ml. of purified, dry dioxan were added, 4 ml. of a solution of hydrogen chloride in dioxan (38 mg./ml.). After standing at room temperature for 90 minutes, the reaction mixture was stirred with 0.4 g. of calcium carbonate for 10 minutes. The solid material was filtered off and the filtrate was refluxed for 90 minutes, after which the solvent was distilled off in vacuo (≤60°). The residue was extracted with methylene chloride (total volume~100 ml.) and the extract was washed with N sodium hydroxide and water. The dried solution was evaporated to dryness and the residue was recrystallized from aceton-hexane to afford 3.32 g. of 9β,10α-pregna-1,4,6-triene-3,20-dione with a melting point of 143–145°.

Physical constants of an analytical sample: Melting point: 145–146°. ε(λ maximum=305 nm.)=12,600. ε(λ maximum=255 nm.)=9,600. $[\alpha]_D^{25} = -356°$.

According to this method were prepared the compounds 6 - chloro - 17β - hydroxy-9β,10α-androsta-1,4,6-triene-3-one-17-acetate. Melting point: 183–184.5°. ε(λ maximum=301 nm.)=10,500. ε(λ maximum=254 nm.)=10,400. $[\alpha]_D^{25} = 247.5°$ (yield 55%). 6-fluoro-9β,10α-pregna-1,4,6-triene-3,20-dione. Melting point 191–193° (vac.). ε(λmaximum=302 nm.)=11,500. ε(λmaximum=254 nm.)=10,400. $[\alpha]_D^{25} = 101.5°$. (yield 58%) and 6-fluoro - 17β - hydroxy-9β,10α-androsta-1,4,6-triene-3-one-17-acetate. Melting point 185–187°. (vac.). ε(λ maximum=301 nm.)=11,250. ε(λmaximum=255 nm.)=10,500. $[\alpha]_D^{25} = -224°$. (yield 67%). In these experiments 140% of the theoretical amount of DDQ was used.

What is claimed is:

1. A method of preparing 1,4,6-trisdehydro-9β,10α steroids of the androstane and pregnane series, said method comprising reacting a 3 keto, Δ$^{4,6}$ 9β,10α steroid of the androstane and pregnane series, at a temperature between −10° C. and +40° C. in anhydrous solvent containing less than 0.5% of water, with 2,3-dichloro-5,6-dicyano-benzoquinone in the presence of a hydrogen halide, neutralizing the reaction mixture, decomposing the resultant 2,3 - dichloro - 5,6 - dicyano - benzoquinone-steroid complex and separting the resultant 1,4,6-trisdehydro-9β,10α steroid from the reaction mixture.

2. The method of claim 1 wherein the 17 carbon atom is substituted in the α position with a moiety selected from the group consisting of hydrogen, alkyl of 1-6 carbon atoms and alkenyl of 2-6 carbon atoms and wherein the 17 carbon atom is substituted in the β position with hydroxy when the moiety at the 17α position is selected from the group consisting of hydrogen, alkyl of 1-6 carbon atoms and alkenyl of 2-6 carbon atoms and wherein the 17 carbon atom is susbtituted in the β position with acetyl when the moiety at the 17α position is selected from the group consisting of hydrogen and hydroxy.

3. The method of claim 2 wherein a halogen of atomic weight less than 126 is present at the carbon atom 6.

4. The method of claim 1 wherein the reaction is carried out for a period of 30 minutes to 3 hours at a temperature between $-10°$ C. and $+40°$ C.

5. The method of claim 1 wherein the reaction medium is heated after being neutralized.

6. The method of claim 1 wherein the acid is hydrogen chloride.

7. The method of claim 6 wherein the concentration of the hydrogen chloride lies between 0.1% w./v. and saturation.

8. The method of claim 6 wherein the reaction is carried out in a neutral polar solvent selected from the group consisting of dioxane and tetrahydrofurane.

References Cited

UNITED STATES PATENTS

| 3,304,314 | 2/1967 | Reerink et al. | 260—397.4 |
| 3,198,792 | 8/1965 | Reerink et al. | 260—239.55 |

OTHER REFERENCES

Ringold et al.: Chem. and Ind., Feb. 31, 1962, No. 5, pp. 211–212.

LEWIS GOTTS, Primary Examiner.

ETHEL G. LOVE, Assistant Examiner.

U.S. Cl. X.R.

260—397.4

UNITED STATES PATENT OFFICE
CERTIFICATE OF CORRECTION

Patent No. 3,497,533 (PHN 961)   Dated February 24, 1970

Inventor(s) PIETER WESTERHOF ET AL

It is certified that error appears in the above-identified patent and that said Letters Patent are hereby corrected as shown below:

Column 1, line 55, after "etherified" insert -- or --.

line 63, change "band" to -- bond --.

Column 2, line 36, "dihydro" should be -- dehydro --.

Signed and sealed this 1st day of September 1970.

(SEAL)
Attest:

Edward M. Fletcher, Jr.
Attesting Officer

WILLIAM E. SCHUYLER, JR.
Commissioner of Patents